(12) United States Patent
Okubo et al.

(10) Patent No.: US 6,927,521 B2
(45) Date of Patent: Aug. 9, 2005

(54) COMMUTATOR AND ELECTRIC ROTARY DEVICE HAVING THE SAME

(75) Inventors: Masashi Okubo, Maruko-machi (JP); Morinobu Endo, Suzaka (JP)

(73) Assignee: Shinano Kenshi Kabushiki Kaisha, Nagano (JP)

( * ) Notice: Subject to any disclaimer, the term of this patent is extended or adjusted under 35 U.S.C. 154(b) by 53 days.

(21) Appl. No.: 10/603,652

(22) Filed: Jun. 26, 2003

(65) Prior Publication Data

US 2004/0000834 A1 Jan. 1, 2004

(30) Foreign Application Priority Data

Jun. 28, 2002 (JP) ...................................... 2002-190210

(51) Int. Cl.$^7$ ............................................. H01R 39/04
(52) U.S. Cl. ...................................... 310/233; 310/236
(58) Field of Search ................................ 310/236, 233, 310/237, 252, 253

(56) References Cited

U.S. PATENT DOCUMENTS

| | | | | |
|---|---|---|---|---|
| 5,830,326 | A | * 11/1998 | Iijima | 204/173 |
| 6,536,265 | B1 | * 3/2003 | Hanchi et al. | 73/105 |
| 6,566,704 | B2 | * 5/2003 | Choi et al. | 257/314 |
| 6,657,354 | B2 | * 12/2003 | Inoue | 310/233 |
| 6,790,425 | B1 | * 9/2004 | Smalley et al. | 423/447.1 |

FOREIGN PATENT DOCUMENTS

| | | | | |
|---|---|---|---|---|
| EP | 744793 | * 11/1996 | ........... H01R/39/04 |
| JP | 53-126101 | * 11/1978 | .......... H02K/13/00 |
| WO | 87/07559 | * 12/1987 | ............. B32B/9/00 |

OTHER PUBLICATIONS

Dresselhaus et al., "Science of Fullerenes & Carbon Nanotubes", 1996, pp. 870–917.*
Stephens "Physics & Chemistry of Fullerenes", 1995, pp. 217–222.*
Seeger et al., "Hands–on tools for nanotechnology", Journal–of–Vacuum–Science–Technology–B (Microelectronics and Nanometer Structures)(USA), vol. 19, No. 6, p. 2717–22, Nov. 2001.*
Kolmogorov et al., "Smoothest bearings: interlayer sliding in multiwalled carbon nanotubes", Physical–Review–Letters (USA), vol. 85, No. 22, p. 4727–30, Nov. 27, 2000.*
Zhao et al., "Ultimate strength of carbon nanotubes: A theoretical study." Physical–Review–B (Condensed Matter and Materials Physics)(USA), vol. 65, No. 14, p. 144105/1–6, Apr. 1, 2002.*
Li et al., "Tensile strength of single–walled carbon nanotubes directly measured from their macroscopic ropes", Applied–Physics Letters (USA), vol. 77, No. 20, p. 3161–3, Nov. 13, 2000.*

* cited by examiner

*Primary Examiner*—Burton Mullins
(74) *Attorney, Agent, or Firm*—Birch, Stewart, Kolasch & Birch, LLP

(57) ABSTRACT

The commutator is capable of reducing contact resistance between the brush and a commutator, improving efficiency of an electric rotary device and restricting exhaustion of the commutator. The commutator comprises: a plurality of commutating pieces having outer faces; and a plurality of sliding members fixed on the outer faces of the commutating pieces, the sliding members including carbon nano fibers or carbon nano tubes whose outermost layers have electric conductivity.

12 Claims, 2 Drawing Sheets

COMMUTATOR AND ELECTRIC ROTARY DEVICE HAVING THE SAME

BACKGROUND OF THE INVENTION

1. Field of the Invention

The present invention relates to a commutator and an electric rotary device, e.g., a motor, an electric generator, having the commutator.

2. Description of Background Art

A conventional commutator of an electric rotary device, e.g., a motor, an electric generator, is shown in FIG. 5. Commutating piece 12 of the commutator 10 are made of a copper alloy, and they are held on a core 14, which is made of, for example, phenolic resin.

The commutating pieces 12 of a micro motor are often made of a clad material, which is made by adhering two metals, e.g., a copper alloy and a gold-silver alloy.

Another conventional commutator is shown in FIG. 6. In the commutator 10, sliding members 16 are respectively fixed on outer faces of commutating pieces 12, which are made of a copper alloy, and they are held by a plastic core 14. Each of the sliding members 16 is manufactured by the steps of: mixing graphite with a binder, e.g., pitch, plastic powders; molding the mixture with applying pressure; and baking the molded body.

In the conventional commutator 10 having metallic commutating pieces 12 on which a brush slides, oxide films are formed on sliding faces of the commutating pieces 12, on which the brush slides, by oxygen in the air. Since the oxide films is an insulating material, an electric current passes between the brush and the commutating pieces by breaking the oxide films.

Micro projections and cavities are formed in surfaces of the commutating pieces 12, so the brush point-contacts the commutating pieces 12. Namely, contact area between the both is very small. Therefore, electric resistance between the brush and the commutating pieces 12 are increased, the brush and the commutating pieces 12 are overheated due to small contact area therebetween, and adhesive wear, which is caused by adhering the brush to the commutating pieces 12 and peeling the adhered parts, occurs in the brush and the commutating pieces 12.

In the case of highly overheating the brush and the commutating pieces or generating an arc therebetween, both members are worn by metal transfer, dispersion of a melted metal.

In another case, abrasive wear, which is caused by forming hard substances, e.g., oxides, on one or both of the sliding faces of the brush and the commutator and grinding soft parts with the hard substances, occurs when the metal transfer progresses. Further, metal powders formed by the hard substances accelerate the abrasive wear.

If the adhesive wear or the abrasive wear is highly progressed, a span of life of a commutating mechanism, which includes the brush and the commutator, is greatly shortened. However, the oxide films formed on the surfaces of the commutating pieces can be broken by wear, so that an electric current can pass between the brush and the commutating pieces. Therefore, a little wear of the commutating piece is required for operating the electric rotary device.

In the case of the micro motor, current intensity passing through the motor is so small that enough energy for breaking oxide films cannot be gained. Thus, expensive gold is included in the sliding faces of a commutator, on which a brush slides, so as not to form oxide films thereon.

In the commutator 10 shown in FIG. 6, the sliding members 16 include graphite so as to solve the problem of forming oxide films. However, crystals of graphite are unstable, so oxidization wear occurs in the sliding faces of the sliding members 16 when graphite is heated at 400° C. or higher in the air. By the oxidization wear, graphite will be consumed as CO or $CO_2$. Therefore, it is improper to use the commutator 10 in the air.

In the case of electric rotary devices using the conventional metallic commutating pieces 12, it is difficult to gain enough sliding between the parts.

On the other hand, in the case of electric rotary devices using the conventional sliding members 16 including graphite, graphite provides enough sliding.

However, graphite employed in the conventional commutators has a layered crystal structure. Electric conductivity in the direction along faces of crystal layers is much greater than that in the direction perpendicular to the faces of the crystal layers. By the anisotropy, contact resistance between graphites and between graphite and metal highly vary according to contact directions therebetween. For example, in FIG. 7, an electric current having enough intensity flows in the direction along faces of the graphite 18; the current passes along an arrow. Therefore, efficient must be low. Note that, symbols 17 stand for copper powders, and symbol 19 stands for a brush.

Further, many projecting parts and voids exist in the commutator, so the area of contacting the brush 19 must be small; the sliding of the commutator must be bad in spite of including graphite. Due to the bad sliding, the exhaustion (the abrasive wear, the arc wear or the oxidization wear) is apt to be occurred, so that the span of life of the commutator must be short.

SUMMARY AND OBJECTS OF THE INVENTION

The present invention has been invented so as to solve the problems of the conventional commutators.

An object of the present invention is to provide a commutator capable of reducing contact resistance between a brush and the commutator, improving efficiency of an electric rotary device and restricting exhaustion of the commutator.

Another object of the present invention is to provide an electric rotary device having said commutator.

To achieve the objects the present invention has following structures.

The commutator of the present invention comprises:
 a plurality of commutating pieces having outer faces; and
 a plurality of combined sliding sections being fixed on the outerface of the commutating pieces, each of the combined sliding section including a first sliding member and a second sliding member,
 wherein the first sliding members include carbon nano fibers whose outermost layers have electric conductivity, and
 the second sliding members include no carbon nano fibers, the second sliding members are respectively integrated with the first sliding members, the second sliding members are fixed on the outer faces of the commutating pieces.

In the commutators of the present invention, the sliding members may include graphite.

Further, the electric rotary device of the present invention employs one of the commutators of the present invention.

By employing the commutator of the present invention, the carbon nano fibers or carbon nano tubes reduce the contact resistance between the brush and the commutator. Thus, the efficiency of the electric rotary device having the commutator can be improved. Further, exhaustion of the commutator can be restricted, so that a span of life of the commutator can be longer.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

In the following embodiments, known carbon nano fibers and carbon nano tubes are employed as carbon fibers.

Sliding members of a commutator, on which a brush slides, includes carbon nano fibers or carbon nano tubes. One layer or a plurality of layers of the carbon fibers are used. One end or both ends of each layer may be closed by a fullerene-shaped cup or cups.

Note that, the carbon nano fiber means a carbon nano tube whose length is at least 100 times greater than a diameter.

Diameters of the carbon fibers used in the embodiments are several nanometers (nm) to several hundred nanometers (nm), e.g., 300 nm, at the largest.

If the diameter of the carbon fibers is less than 15 nm, electric conductivity is reduced. In the case of the carbon fibers whose diameter is less than 15 nm, if chiral indexes "n" and "m", which defines chiral vector assigning a spiral direction of a crystal structure, satisfy following formulas F1 or F2, the carbon fibers have electric conductivity.

$$n-m = \text{a multiple of 3} \quad (F1)$$

$$n = m \quad (F2)$$

On the other hand, in the case of the carbon fibers whose diameter is 15 nm or more, the carbon fibers always have electric conductivity.

In the present invention, the carbon fibers is mixed in a material of sliding members of the commutator. Unlike graphite, the carbon fibers have no anisotropy of electric conductivity. Namely, an electric current can pass surfaces of the carbon fibers in every direction. The carbon fibers mutually contact or contact other members. Therefore, at least outermost layers of the carbon fibers must have good electric conductivity.

In the present embodiments, as an example, the carbon nano fibers or the carbon nano tubes are added to a material of the sliding members including graphite. For example, the material is mixed with the carbon nano fibers or the carbon nano tubes. The mixture is molded with applying pressure. Finally, the molded body is baked to complete the sliding member. Note that, steps of manufacturing the brush is not limited.

Figure 1:
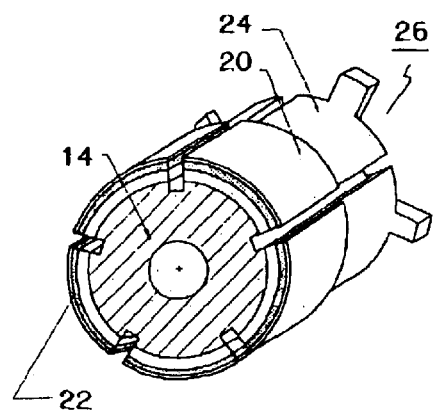
FIG. 1 is a perspective view of a commutator of a first embodiment of the present invention.

The commutator of a first embodiment is shown in FIG. 1. The commutator 26 is manufactured by the steps of: supplying materials of sliding members into a molding die, in which a material including the carbon nano fibers or the carbon nano tubes are provided on the brush side and in which another material including no carbon nano fibers or carbon nano tubes are provided on the other side; molding the materials with applying pressure; and baking the molded body. With these manufacturing steps, the commutator 26 has first sliding members 20, which include the carbon nano fibers or the carbon nano tubes and which are located on the brush side, and second sliding members 24, which include no carbon nano fibers or carbon nano tubes and which are located on the other side.

Materials for forming the sliding members, except the carbon nano fibers or the carbon nano tubes, may include graphite, metal powders, a binder (pitch or synthetic resin powders), an additive (solid lubricant), etc. The metal powders, the binder and the additive may be optionally used, and the amount of the materials may be adjusted on the basis of use. Namely, they are not limited.

In addition, the amount of the carbon nano fibers or the carbon nano tubes also may be adjusted on the basis of use.

Figure 2:
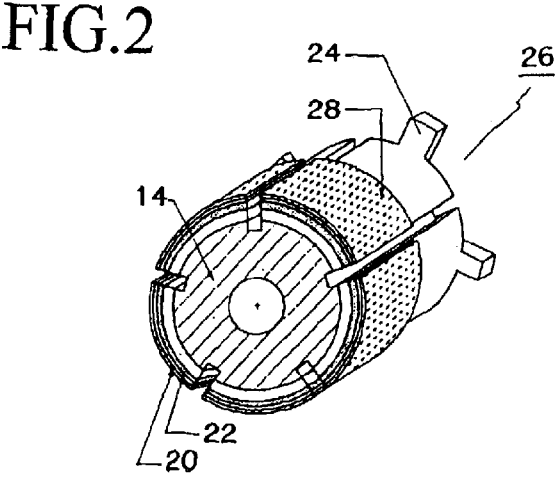
FIG. 2 is a perspective view of a commutator of a second embodiment.

In a second embodiment shown in FIG. 2, a commutator 26 has three kinds of sliding members. Each of first sliding members 20 including carbon nano fibers or carbon nano tubes that are sandwiched between a second sliding member 22 and a third sliding member 28, which include no carbon nano fibers or carbon nano tubes. The commutator 26 is manufactured by the steps of: supplying materials of the sliding members into a molding die, in which the material of the first sliding members 20 are sandwiched between the materials of the second and the third sliding members 22 and 28 as described above; molding the materials with applying pressure; and baking the molded body.

At the beginning of using a motor, the commutator 26 insecurely contacts a brush due to positioning errors of the brush and the commutator 26, or vibration of the brush, etc. To solve the problem, the commutator 26 has a third sliding members 28. The third sliding members 28 include abrasable layers, which can be easily abraded, so that the commutator 26 can securely contact the brush after the abrasion.

Figure 3:
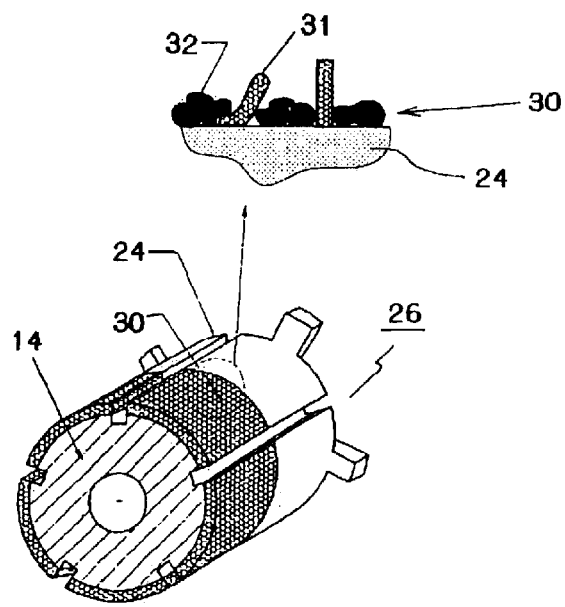
FIG. 3 is a perspective view of a commutator of a third embodiment.

In a third embodiment shown in FIG. 3, sliding sections of metallic commutating pieces 24, on which a brush slides, are plated with an electric conductive metal. The plating is dispersal plating, in which carbon nano fibers or carbon nano tubes are mixed with a plating solution, and a plating metal 32 enclosing the carbon nano fibers 31 or the carbon nano tubes 31 precipitates on the commutating pieces 24. By the dispersal plating, sliding films 30 including the carbon nano fibers or the carbon nano tubes are formed on the commutating pieces 30.

As shown in a partial enlarged part of FIG. 3, parts of carbon fibers 31 are held and fixed by the plating metal 32.

The dispersal plating is one of the means for fixing the carbon nano fibers 31 or the carbon nano tubes 31. In another embodiment, carbon nano fibers or carbon nano tubes, which have been floated in a gas, may be fixed to the commutating pieces 24 by thermal spraying. Namely, the fixing means is not limited.

The commutator 26 of each embodiment can be employed as a commutator of a known electric rotary device, e.g., motor, electric generator. Explanation of the known electric rotary device will be omitted.

The carbon fibers (the carbon nano fibers or the carbon nano tubes) are around one layer of graphite crystal. Therefore, the carbon fibers have one dimensional electric conductivity. Contact resistance (electric resistance) between the carbon fibers, between the carbon fibers and the metal and between the carbon fibers and the graphite can always be stable.

Figure 4:
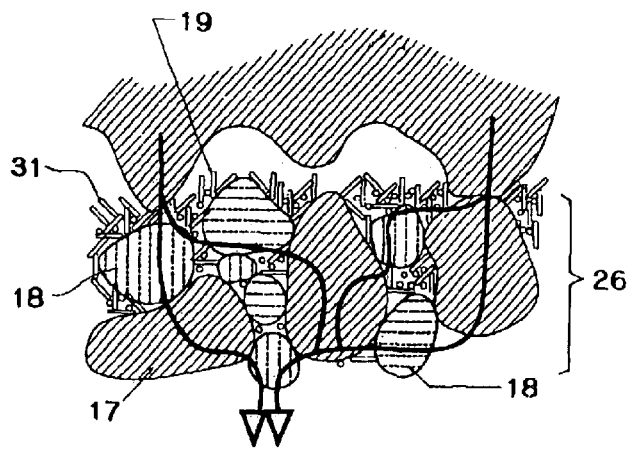
FIG. 4 is an explanation view of a section of a sliding member.
Figure 5:
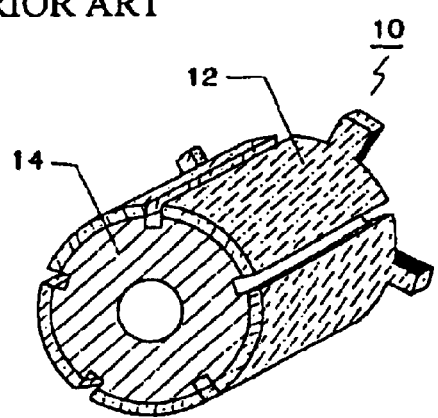
FIG. 5 is a perspective view of the conventional commutator.
Figure 6:
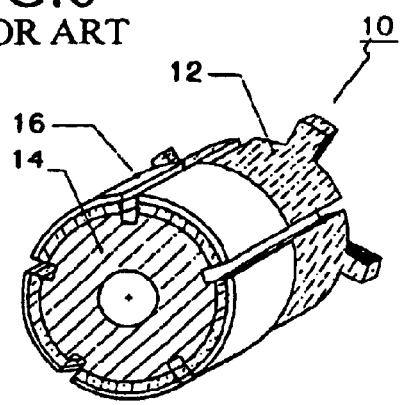
FIG. 6 is a perspective view of another conventional commutator.
Figure 7:
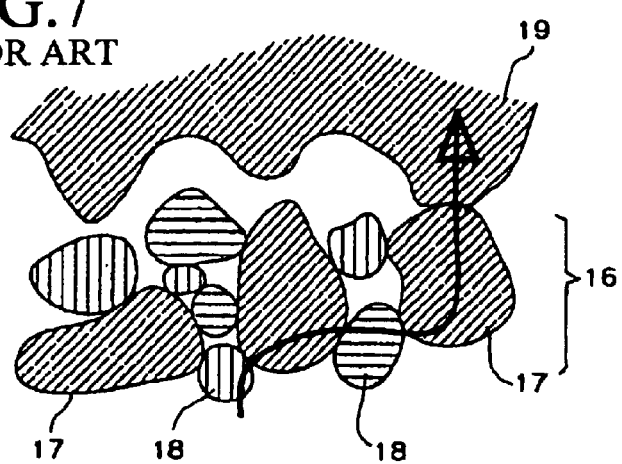
FIG. 7 is an explanation view of a section of the conventional sliding member.

Unlike other materials constituting the brush, the carbon nano fibers or the carbon nano tubes are fine materials, so they can enter gaps between particles of other materials (see FIG. 4). In FIG. 4, a symbol 17 stands for a copper powder, and a symbol 18 stands for graphite. Thus, the carbon fibers 31 (the carbon nano fibers or the carbon nano tubes) fill the gaps between the copper powders 17 and the graphite 18.

By filling the gaps with the carbon fibers 31, concaves or cavities in a surface of the commutator 26, which are caused by the gaps, are filled with the carbon fibers 31, so that the roughness of outer faces (sliding faces) of the sliding members, which contacts the brush, can be improved. Namely, smooth sliding faces can be formed.

Further, the carbon nano fibers or the carbon nano tubes are highly chemically stable, so no oxide films or sulfide films are formed thereon. Namely, removing the oxide films or sulfide films, which is essential for the conventional commutators, is not required.

Crystal structures of carbon nano fibers or carbon nano tubes are more stable than those of graphite and glass carbon, so the temperature of beginning oxidization of carbon nano fibers or carbon nano tubes is high. Therefore, carbon nano fibers or carbon nano tubes have sufficient resistance to avoid exhaustion.

Since the sliding faces or the outer faces of the commutaror 26, on which the brush 19 slides, is smooth, frictional resistance between the brush and the commutator 26 can be reduced. Further, a projection or projections formed by the metal transfer can be prevented, so that the abrasive wear can be reduced.

By improving the roughness of the sliding faces of the commutator 26, the actual contact area between the brush 19 and the commutator 26 can be broader. Therefore, the resistance between the brush 19 and the commutator 26 can be reduced, and the load and an electric current can be well dispersed, so that heat generated in the contact parts can be reduced. By reducing the heat, the adhesive wear occurring between the sliding faces of the brush 19 and the commutator 26 can be reduced.

The carbon nano fibers or the carbon nano tubes have not only high electric conductivity but also high heat conductivity. Further, as described above, the fine carbon nano fibers or the fine carbon nano tubes fill the gaps between particles of the materials constituting the sliding faces of the brush 19 and the commutator 26, so that the actual contact area between the both can be much broader. By the broad contact area, heat generated between the brush 19 and the commutator 26 can be dispersed in the commutating pieces, so that deterioration of the commutator 26 and the oxidization wear caused by overheating the sliding faces can be reduced. Therefore, disorganization of the sliding faces of the brush 19 and the commutator 26 can be prevented.

The carbon nano fibers and the carbon nano tubes have high tensile strength in the axial directions thereof, and they have enough flexibility. Even if the carbon nano fibers or the carbon nano tubes project from the sliding face of the commutator 26 which does not contact the brush, they can be easily bent on the sliding face of the brush by a load, which is applied when the brush contacts the commutator. With this action, concentrating a load to front ends of the carbon nano fibers or the carbon nano tubes can be prevented. Further, side faces of the carbon nano fibers or the carbon nano tubes contact the brush instead of the front ends thereof. Thus, the actual contact area between the brush and the commutator can be broader. Note that, in the conventional motor, front ends of projecting material constituting a commutator contact a brush, so their actual contact area is small, and a load applies to the front ends thereof.

Further, the melting point of carbon nano fibers or carbon nano tubes are high, so the arc wear caused by metal transfer can be prevented.

In the commutator of the present invention, expensive carbon nano fibers or carbon nano tubes are provided to only the outer faces (the sliding faces), on which the brush slides, so the total amount can be reduced. Namely, the manufacturing cost of the commutator can be reduced, and a span of life of the commutator can be made longer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A commutator, comprising:
   a plurality of commutating pieces having outer faces; and
   a plurality of combined sliding sections being fixed on the outer faces of said commutating pieces, each of said combined sliding section including a first sliding member and a second sliding member,
   wherein the first sliding members include carbon nano fibers whose outermost layers have electric conductivity, and
   the second sliding members include no carbon nano fibers, the second sliding members are respectively integrated with the first sliding members, the second sliding members are fixed on the outer faces of said commutating pieces.

2. The commutator according to claim 1,
   wherein said combined sliding sections further include third sliding members, which include no carbon nano fibers and which are respectively integrated with the first sliding members.

3. The commutator according to claim 1,
   wherein said sliding members include graphite.

4. A commutator, comprising:
   a plurality of commutating pieces having outer faces; and
   a plurality of combined sliding sections being fixed on the outer faces of said commutating pieces, each of said combined sliding section including a first sliding member and a second sliding member,
   wherein the first sliding members include carbon nano tubes whose outermost layers have electric conductivity, and
   the second sliding members include no carbon nano tubes, the second sliding members are respectively integrated with the first sliding members, the second sliding members are fixed on the outer faces of said commutating pieces.

5. The commutator according to claim 4,
wherein said combined sliding sections further include third sliding members, which include no carbon nano tubes and which are respectively integrated with the first sliding members.

6. The commutator according to claim 4 wherein said sliding members include graphite.

7. An electric rotary device,
having a commutator, which comprises;
a plurality of commutating pieces having outer faces; and
a plurality of combined sliding sections being fixed on the outerface of said commutating pieces, each of said combined sliding sections including a first sliding member and a second sliding member,
wherein the first sliding members include carbon nano fibers whose outermost layers have electric conductivity, and
the second sliding members include no carbon nano fibers, the second sliding members respectively integrated with the first sliding members, the second sliding members are fixed on the outer faces of said commutating pieces.

8. The electric rotary device according to claim 7,
wherein said combined sliding sections further include third sliding members, which include no carbon nano fibers and which are respectively integrated with the first sliding members.

9. The electric rotary device according to claim 7,
wherein said sliding members include graphite.

10. The electric rotary device,
having a commutator, which comprises;
a plurality of commutating pieces having outer faces; and
a plurality of combined sliding sections being fixed on the outerface of said commutating pieces, each of said combined sliding section including a first sliding member and a second sliding member,
wherein the first sliding member include carbon nano tubes whose outermost layers have electric conductivity, and
the second sliding members include no carbon nano tubes, the second sliding members are respectively integrated with the first sliding members, the second sliding members are fixed on the outer faces of said commutating pieces.

11. The electric rotary device according to claim 10,
wherein said combined sliding sections further include third sliding members, which include no carbon nano tubes and which are respectively integrated with the first sliding members.

12. The electric rotary device according to claim 10,
wherein said sliding members include graphite.

* * * * *